United States Patent
Ellison et al.

(10) Patent No.: US 9,409,815 B2
(45) Date of Patent: Aug. 9, 2016

(54) OPAQUE COLORED GLASS-CERAMICS COMPRISING NEPHELINE CRYSTAL PHASES

(71) Applicant: CORNING INCORPORATED, Corning, NY (US)

(72) Inventors: Adam James Ellison, Corning, NY (US); Lisa Anne Moore, Corning, NY (US); Taheisha Linette Werner, Corning, NY (US)

(73) Assignee: CORNING INCORPORATED, Corning, NY (US)

(*) Notice: Subject to any disclaimer, the term of this patent is extended or adjusted under 35 U.S.C. 154(b) by 0 days.

(21) Appl. No.: 14/672,854

(22) Filed: Mar. 30, 2015

(65) Prior Publication Data

US 2015/0284288 A1   Oct. 8, 2015

Related U.S. Application Data

(60) Provisional application No. 61/975,322, filed on Apr. 4, 2014.

(51) Int. Cl.
 *C03C 10/10* (2006.01)
 *C03C 10/00* (2006.01)
 (Continued)

(52) U.S. Cl.
 CPC ............. *C03C 10/0018* (2013.01); *C03B 32/02* (2013.01); *C03C 3/085* (2013.01); *C03C 4/02* (2013.01); *C03C 21/002* (2013.01); *C03C 2204/04* (2013.01)

(58) Field of Classification Search
 CPC .................................................. C03C 10/0018
 See application file for complete search history.

(56) References Cited

U.S. PATENT DOCUMENTS 2,933,857 A    4/1960  Stookey
3,146,114 A    8/1964  Kivlighn
(Continued)

FOREIGN PATENT DOCUMENTS

CN    102795779    11/2012
GB      869328      5/1961
(Continued)

OTHER PUBLICATIONS

Patent Cooperation Treaty International Notification of Transmittal of the International Search Report and The Written Opinion of the International Searching Authority, international application No. PCT/US2015/023978: mailing date Jul. 21, 2015, 11 pages.
(Continued)

Primary Examiner — Karl Group
(74) Attorney, Agent, or Firm — Payal A. Patel

(57) ABSTRACT

Disclosed herein are opaque glass-ceramics comprising at least one nepheline crystal phase and comprising from about 30 mol % to about 65 mol % $SiO_2$, from about 15 mol % to about 40 mol % $Al_2O_3$, from about 10 mol % to about 20 mol % $(Na_2O+K_2O)$, and from about 1 mol % to about 10 mol % $(ZnO+MgO)$. Also disclosed herein are opaque-glass ceramics comprising at least one nepheline crystal phase and at least one spinel-structure phase doped with at least one colorant chosen from transition metals and rare earth elements. Further disclosed herein are methods for making these opaque glass-ceramics.

8 Claims, 8 Drawing Sheets

(51) Int. Cl.
*C03B 32/02* (2006.01)
*C03C 21/00* (2006.01)
*C03C 3/085* (2006.01)
*C03C 4/02* (2006.01)

(56) References Cited

U.S. PATENT DOCUMENTS

| | | | |
|---|---|---|---|
| 3,313,609 A | 4/1967 | Megles | |
| 3,528,828 A | 9/1970 | Smith | |
| 3,650,720 A | 3/1972 | Grego et al. | |
| 3,720,526 A | 3/1973 | Duke et al. | |
| 4,022,627 A | 5/1977 | Tashiro et al. | |
| 4,310,595 A * | 1/1982 | Beall | C03C 10/0018 428/325 |
| 4,341,544 A * | 7/1982 | Beall | C03C 10/0018 65/30.14 |
| 4,341,872 A | 7/1982 | MacDowell | |
| 5,275,978 A | 1/1994 | Shibuya et al. | |
| 5,422,318 A | 6/1995 | Hagg et al. | |
| 6,348,425 B1 | 2/2002 | Barattini et al. | |
| 7,008,891 B2 * | 3/2006 | Kobayashi | C03C 10/0018 428/426 |
| 8,048,816 B2 | 11/2011 | Beall et al. | |
| 2004/0116268 A1 * | 6/2004 | Kobayashi | C03C 10/0018 501/6 |
| 2013/0224491 A1 | 8/2013 | Smedskjaer et al. | |
| 2015/0111717 A1 * | 4/2015 | Gabel | C03C 3/087 501/32 |

FOREIGN PATENT DOCUMENTS

| | | |
|---|---|---|
| GB | 1105434 | 4/1965 |
| JP | 2002265234 | 9/2002 |
| WO | 2014001299 | 1/2014 |

OTHER PUBLICATIONS

Dugue A., et. al, J. Am. Ceram. Soc., 95 [11] 3483-3489 (2012).
S. Khonthon, et. al, J. Ceram. Soc. Japan, 114 [9] 791-794 (2006).
L.R. Pinckney and G.H. Beall, Proc. SPIE vol. 4452, 93-99 (2001).
D.A. Duke, et. al., J. Am. Ceram. Soc. 50 [2] 67-74 (1967).
S. Khonthon, et. al, J. Ceram. Soc. Japan, 114 [9]: 791-794 (2006)).

* cited by examiner

OPAQUE COLORED GLASS-CERAMICS COMPRISING NEPHELINE CRYSTAL PHASES

CROSS-REFERENCE TO RELATED APPLICATIONS

This application claims the benefit of priority under 35 U.S.C. §119 of U.S. Provisional Application Ser. No. 61/975,322 filed on Apr. 4, 2014 the content of which is relied upon and incorporated herein by reference in its entirety.

FIELD OF THE DISCLOSURE

The present disclosure relates generally to opaque glass-ceramics comprising at least one nepheline crystal phase, and more particularly to opaque, colored nepheline-gahnite glass-ceramics, and methods for making the same.

BACKGROUND

Strong opaque materials have recently become desirable for use in electronic casings and other packaging applications, such as cosmetic packaging. For instance, opaque white and black glass-ceramics, such as white beta-spodumene glass-ceramics, are currently being used in smartphone housings. While white and black casings have been popular, there is growing consumer demand for a full palette of opaque, colored glass-ceramics with improved strength for electronic casings and other applications.

Opal glasses with a wide spectrum of colors are commercially available. However, opal glasses tend to suffer from a trade-off between opacity and durability. The precipitation of opalizing phase(s) in the glasses can produce microstructures with an inhomogeneous distribution of large precipitates, which is not conducive to toughness or smooth surfaces. Opaque glass-ceramics, such as lithium disilicate (Fotoceram®), cordierite (radomes), nepheline (Centura®), beta-spodumene (Corning Ware®), and beta-quartz (Visions®), are also known in the art. However, these glass-ceramics are currently limited in terms of their color palette, particularly in terms of obtaining bright colors.

Color is traditionally imparted to glass-ceramics through glazes, which are, in general, fritted materials designed to sinter, flow, and crystallize in one step at low temperatures to form a uniform coating on the glass-ceramic. Color in glasses and glass-ceramics, as opposed to color obtained by applying a glaze, is generally obtained through the addition of a transition metal or rare earth oxide to the batch composition. The color obtained using such oxides depends on various factors, such as the oxidation state of the ion, the coordination of the ion, and/or the nature of the surrounding ions. In glass-ceramics, the transition metal or rare earth ions can partition into the main crystalline phase, the residual glass phase (different from the starting glass), or a secondary (accessory) amorphous or crystalline phase. Thus, the color of the cerammed material (glass-ceramic) can be different from that of the uncerammed material (glass) and may change depending on the ceramming schedule. Colorants have been incorporated into beta-spodumene (opaque) glass-ceramics to produce earthtone products (e.g., beige Corning Ware®), but it is difficult to obtain opaque glass-ceramics in bright colors.

Accordingly, it would be advantageous to provide opaque glass-ceramics which can be doped with colorants to produce bright colors and which can also be chemically strengthened by ion exchange. Additionally, it may also be advantageous to provide a doped spinel-type crystal phase in a nepheline glass-ceramic to produce a strong, opaque, colored product which can be used in various packaging applications, such as electronic casings and cosmetic packaging.

SUMMARY

The disclosure relates, in various embodiments, to an opaque glass-ceramic comprising at least one nepheline crystal phase and comprising about from about 30 mol % to about 65 mol % $SiO_2$, from about 15 mol % to about 40 mol % $Al_2O_3$, a combined amount of $Na_2O$ and $K_2O$ ($Na_2O+K_2O$) in an amount in the range from about 10 mol % to about 20 mol %, from about 0 mol % to about 10 mol % ZnO, and about 0 mol % to about 10 mol % MgO, wherein the total amount of ZnO and MgO (ZnO+MgO) is in the range from about 0.5 mol % to about 10 mol %. In certain embodiments, the glass-ceramic further comprises at least one spinel-structure phase doped with at least one colorant chosen from transition metals and rare earth elements. The spinel-structure phase may comprise, but is not limited to, gahnite, magnesium aluminate, and magnesio-gahnite, to name a few. According to various embodiments, the opaque glass-ceramic may be chemically strengthened by ion exchange.

The disclosure also relates to a method for making an opaque glass-ceramic comprising at least one nepheline crystal phase, the method comprising heating a precursor glass at a temperature and for a time sufficient to convert the precursor glass into a glass-ceramic, wherein the precursor glass comprises about from about 30 mol % to about 65 mol % $SiO_2$, from about 15 mol % to about 40 mol % $Al_2O_3$, a combined total of Na2O and K2O ($Na_2O+K_2O$) from about 10 mol % to about 20 mol %, from about 0 mol % to about 10 mol % ZnO, and from about 0 mol % to about 10 mol % MgO, wherein the total amount of ZnO and MgO (ZnO+MgO) is in the range from about 0.5 mol % to about 10 mol %. In various embodiments, the glass-ceramic further comprises at least one spinel-structure phase and the method further comprises doping the precursor glass with about 0.05 mol % to about 5 mol % of at least one colorant chosen from transition metal oxides and rare earth oxides. According to other embodiments, a batch composition may be melted at a temperature ranging from about 1400° C. to about 1800° C. and for a time ranging from about 1 hour to about 20 hours to produce the precursor glass. The precursor glass may, in certain embodiments, be heated at a temperature ranging from about 700° C. to about 1200° C. for a time ranging from about 4 hours to about 20 hours. The method may further comprise a step of chemically strengthening the opaque glass-ceramic by an ion exchange process.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be best understood when read in conjunction with the following drawings, where like structures are indicated with like reference numerals and in which.

DETAILED DESCRIPTION

Figure 1:
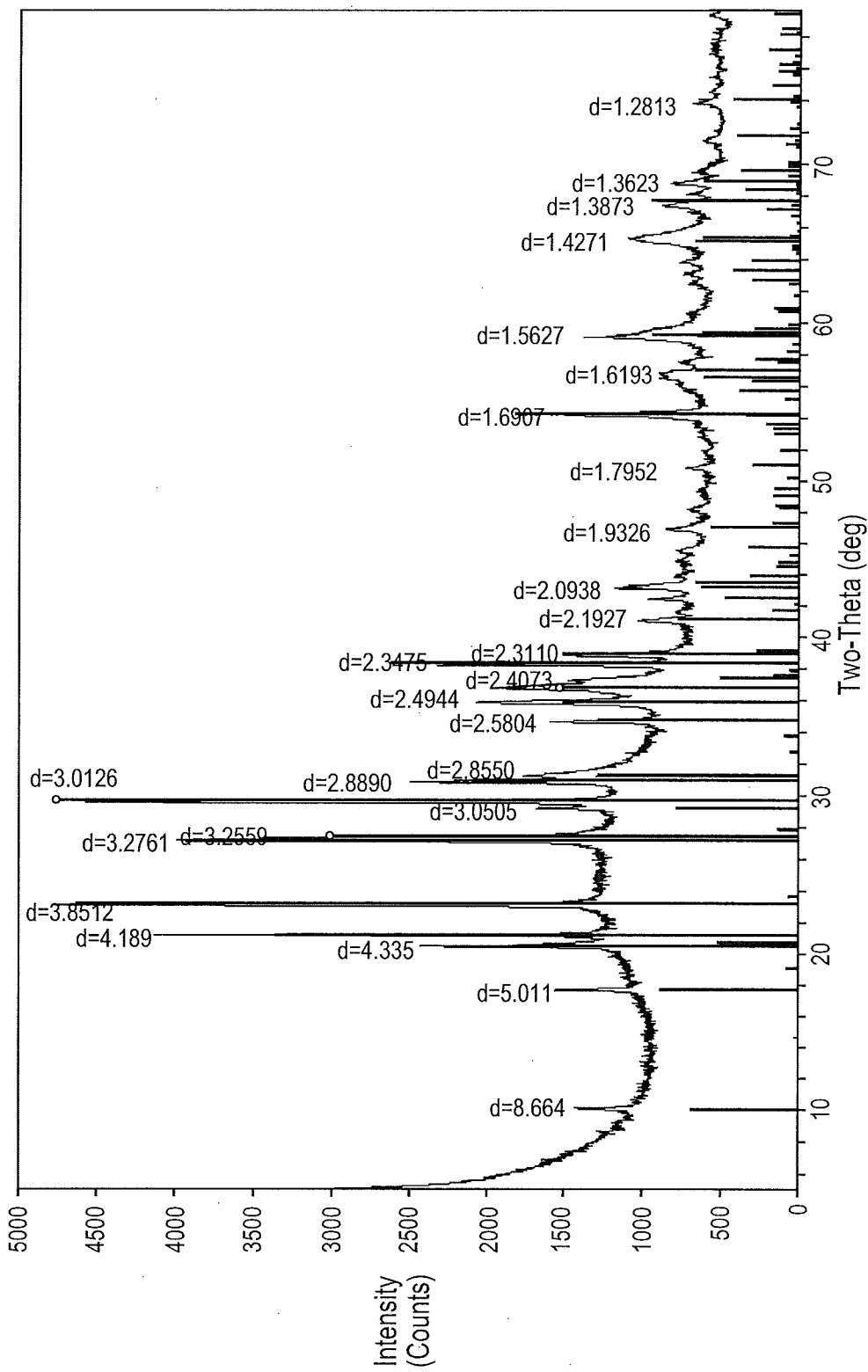
FIG. 1 is an XRD pattern of an opaque glass-ceramic produced according to one embodiment of the disclosure.

Disclosed herein are opaque glass-ceramics comprising at least one nepheline crystal phase and comprising from about 30 mol % to about 65 mol % $SiO_2$, from about 15 mol % to about 40 mol % $Al_2O_3$, a combined amount of $Na_2O$ and $K_2O$ ($Na_2O+K_2O$) from about 10 mol % to about 20 mol %, from about 0 mol % to about 10 mol % ZnO, and from about 0 mol % to about 10 mol % MgO, wherein the combined amount of ZnO and MgO (ZnO+MgO) is in the range from about 0.5 mol % to about 10 mol %. According to various embodiments, the glass-ceramics further comprise at least one spinel-structure phase doped with at least one colorant chosen from transition metals and rare earth elements. Also disclosed herein are methods for making the disclosed opaque glass-ceramics. Additional aspects of the disclosure are provided in more detail below.

Glass-Ceramics

Glass-ceramics produced according to the present disclosure are opaque, i.e., not transparent. As used herein, the term "opaque" is intended to denote that the glass ceramic, when formed into a sheet having a thickness of approximately 1 mm, has a transmission of less than about 85% in the visible region of the spectrum (a wavelength range from about 400 nm to about 700 nm). For instance, an exemplary opaque glass-ceramic may have less than about 80% transmittance in the visible light range, such as less than about 75%, less than about 70%, less than about 65%, less than about 60%, less than about 55%, or less than about 50% transmittance, including all ranges and subranges therebetween. In certain embodiments, an exemplary opaque glass ceramic may have a transmittance of less than about 50% in the ultraviolet (UV) region (350-400 nm), such as less than about 45%, less than about 40%, less than about 35%, less than about 30%, less than about 25%, less than about 20%, less than about 15%, or less than about 10% transmittance, including all ranges and subranges therebetween.

Glass-ceramics described herein may comprise randomly oriented nepheline and spinel crystals dispersed within a matrix of residual glass. Such glass-ceramics can be produced through controlled internal nucleation and crystallization of a precursor glass, as described in more detail herein. The precursor glass and the final glass-ceramic product can thus both comprise various inorganic oxides.

The precursor glass and/or glass-ceramic may comprise, for example, from about 30 mol % to about 65 mol % $SiO_2$, from about 15 mol % to about 40 mol % $Al_2O_3$, from about 10 mol % to about 20 mol % ($Na_2O+K_2O$), from about 0 mol % to about 10 mol % ZnO, and from about 0 mol % to about 10 mol % MgO, wherein (ZnO+MgO) is in the range from 0.5 mol % to about 10 mol %. In certain embodiments, the precursor glass and/or glass-ceramic may comprise from about 45 mol % to about 65 mol % $SiO_2$, from about 20 mol % to about 30 mol % $Al_2O_3$, from about 5 mol % to about 15 mol % $Na_2O$, from about 1 mol % to about 10 mol % $K_2O$, from about 1 mol % to about 5 mol % ZnO, and from about 0 mol % to about 5 mol % MgO, wherein (ZnO+MgO) is in the range from about 1 mol % to about 10 mol %. For example, the precursor glass and/or glass ceramic may comprise from about 50 mol % to about 55 mol % $SiO_2$, from about 20 mol % to about 25 mol % $Al_2O_3$, from about 10 mol % to about 15 mol % $Na_2O$, from about 1 mol % to about 5 mol % $K_2O$, and from about 1 mol % to about 3 mol % ZnO. According to some embodiments, the molar ratio of ($Na_2O+K_2O$) to $Al_2O_3$ may be less than about 1, for instance, less than about 0.9, less than about 0.8, or less than about 0.7, including all ranges and subranges therebetween.

The glass-ceramic disclosed herein can comprise nepheline ($Na_2O$—$K_2O$—$Al_2O_3$—$SiO_2$) and spinel-type crystal phases. The spinel-structure phase may comprise, in certain embodiments, gahnite ($ZnAl_2O_4$), magnesium aluminate ($MgAl_2O_4$), and/or magnesio-gahnite (($Zn, Mg)Al_2O_4$). As such, $Na_2O$, $K_2O$, $Al_2O_3$, and $SiO_2$ can be the basic oxide components for the formation of the nepheline crystal phase, while $Al_2O_3$ and ZnO and/or MgO can be the basic oxide components for forming the spinel phase. In the case of a nepheline-gahnite glass-ceramic, a precursor glass can be employed that does not comprise MgO. Likewise, in the case of a nepheline-magnesium aluminate glass-ceramic, a precursor glass can be employed that does not comprise ZnO. In other embodiments, the precursor glass may comprise both ZnO and MgO, in which case the glass-ceramic may comprise nepheline and gahnite, magnesium aluminate, and/or magnesio-gahnite phases. Spinel-structure crystals, such as gahnite, magnesium aluminate, and magnesio-gahnite can precipitate as the primary or secondary phases in some glass-ceramics.

The spinel-structure phase may be at least partially doped with at least one colorant ion. According to various embodiments, the dopant can be predominantly incorporated into the spinel-structure phase. In other embodiments, the dopant can be incorporated solely into the spinel-structure phase. In still further embodiments, the dopant may be partially incorporated in both the spinel-structure phase and another phase within the glass-ceramic, such as the residual glass phase. Suitable dopants include, for example, transition metals and rare earth elements. For instance, the spinel-structure phase may be doped with at least one colorant ion chosen from manganese, iron, cobalt, nickel, copper, vanadium, chromium, yttrium, and lanthanum. Substitution of different transition metal or rare earth ions on either the tetrahedral (A), octahedral (B), or both sides of the $AB_2O_4$ cubic lattice can produce bright colors. As such, spinel-type phases may be used in certain embodiments for providing bright colors (e.g., red, pink, yellow, green, blue, violet, etc).

As discussed in more detail below, exemplary glass-ceramics can be chemically strengthened by ion exchange. Ions within the glass sheet at or near the surface of the glass sheet are exchanged for larger metal ions, for example, from a salt bath. The incorporation of the larger ions into the glass can strengthen the sheet by creating a compressive stress in a near surface region. A corresponding tensile stress can be induced within a central region of the glass sheet to balance the compressive stress.

The precursor glass and/or glass-ceramic may therefore comprise, in certain embodiments, about from 0.05 mol % to about 5 mol % of at least one oxide chosen from transition metal oxides and rare earth oxides. For example, the precursor glass and/or glass-ceramic may comprise from about 0.05 mol % to about 3 mol % of at least one transition metal oxide and/or rare earth oxide, such as from about 0.1 mol % to about 2 mol %, or from about 0.5 mol % to about 1 mol %, including all ranges and subranges therebetween. As such, the precursor glass and/or glass-ceramic may comprise at least one oxide chosen from oxides of manganese, iron, cobalt, nickel, copper, vanadium, chromium, yttrium, lanthanum, and combinations thereof.

According to various embodiments, nucleating agents, such as $TiO_2$ and $ZrO_2$ may be present in the precursor glass and/or glass-ceramic. For example, a total amount of $TiO_2$ and $ZrO_2$ ($TiO_2+ZrO_2$) from about 4 mol % to about 12 mol % may be present in the precursor glass and/or glass ceramic. Titania alone, zirconia alone, or a mixture of the two may be used to nucleate the spinel crystal phase. Accordingly, in some embodiments, $TiO_2$ may be present in an amount from about 0 mol % to about 12 mol %. In some embodiments, $ZrO_2$ may be present in an amount from about 0 mol % to about 12 mol %, so long as the total amount of ($TiO_2+ZrO_2$) is in the range from about 4 mol % to about 12 mol %. According to various embodiments, titania alone, in an amount in the range from about 4 mol % to about 12 mol %, such as from about 6 mol % to about 10 mol %, may be used to nucleate the spinel crystal phase. Titania may serve both as a nucleating agent and as an integral component of the spinel crystals.

Fining agents, such as $As_2O_5$, $SnO_2$, or $Sb_2O_3$, may also be present in the precursor glass and/or glass-ceramic according to various embodiments. If desired, such oxides are generally present in amounts less than about 1 mol %, for example, less than about 0.5 mol %. Other oxides and/or fluorides including, but not limited to, $Cs_2O$, $Rb_2O$, $WO_3$, $CaO$, $SrO$, $Nb_2O_5$, $AlF_3$, $B_2O_3$, and $P_2O_5$, may also be included in the precursor glass and/or glass-ceramic in amounts up to about 5 mol %. In other embodiments, up to about 10 mol % of oxides chosen from $BaO$, $Bi_2O_3$, $Ta_2O_5$, $Ga_2O_3$, and $PbO$ may be included in the precursor glass and/or glass-ceramic. According to certain embodiments, the precursor glass and/or glass-ceramic may be substantially free of lithium, for instance, substantially free of lithium oxide ($Li_2O$). While $Li_2O$ is often used in glass-ceramics that can be chemically strengthened by ion exchange, lithium ions may poison the ion exchange bath and may, in certain embodiments, be undesirable in the glass-ceramics disclosed herein. Accordingly, the precursor glass and/or glass-ceramic may be free of lithium or substantially free of lithium (e.g., less than about 0.01 mol %).

The glass-ceramics produced as disclosed herein may exhibit a wide variety of colors including, but not limited to, pink, red, yellow, green, blue and purple. As opposed to prior art glazing or staining methods, the glass-ceramics produced according to the disclosed methods have through-body color, e.g., the colorant is distributed throughout the glass-ceramic, not just on the outer surface(s). Additional benefits may include increased protection against color change during ion exchange, better color control, and/or the ability to produce secondary colors or color mixtures by incorporating colorant ions (same or different) into the residual glass phase. Furthermore, due to the presence of alkali ions in the nepheline crystal phase, the glass-ceramics disclosed herein can be chemically strengthened by ion exchange.

Methods

Further disclosed herein are methods for making opaque glass-ceramics comprising at least one nepheline crystal phase, the method comprising heating a precursor glass at a temperature and for a time sufficient to convert the precursor glass into a glass-ceramic, where the precursor glass comprises from about 30 mol % to about 65 mol % $SiO_2$, from about 15 mol % to about 40 mol % $Al_2O_3$, from about 10 mol % to about 20 mol % ($Na_2O+K_2O$), from about 0 mol % to about 10 mol % $ZnO$, and from about 0 mol % to about 10 mol % $MgO$, wherein ($ZnO+MgO$) is in the range from about 0.5 mol % to about 10 mol %. In various embodiments, the glass-ceramics may further comprise at least one spinel-structure phase and the method may further comprise doping the precursor glass with at least one colorant chosen from transition metal oxides and rare earth oxides. The colorant may ne be present in the precursor glass, after doping, in an amount in the range from about 0.05 mol % to about 5 mol %.

According to the methods disclosed herein the precursor glass may be provided or the precursor glass may be produced by melting the appropriate batch materials. For instance, raw materials such as carbonates, nitrates, and/or hydroxides, can be used as the sources for the oxides present in the precursor glass, or the oxides themselves can be added to the batch. Non-limiting examples of suitable batch materials include silica ($SiO_2$); alumina, hydrated alumina, and aluminum hydroxide ($Al_2O_3$); sodium carbonate ($Na_2O$); potassium carbonate ($K_2O$); zinc oxide ($ZnO$); titanium dioxide ($TiO_2$); zirconium dioxide ($ZrO_2$); tin (IV) oxide ($SnO_2$); various transition metal oxides (e.g., $MnO_2$, $Fe_2O_3$, $Co_3O_4$, $NiO$, and $CuO$); and combinations thereof. Of course, other raw materials and oxides may be included in the batch composition, as desired.

The raw materials may be mixed together to form a batch composition which is then melted at a suitable temperature to form a precursor glass. By way of non-limiting example, the batch composition may be melted at a temperature ranging from about 1400° C. to about 1800° C., such as from about 1500° C. to about 1750° C., or from about 1600° C. to about 1650° C., including all ranges and subranges therebetween. The batch composition may be held at this temperature for a suitable time, for example, a time ranging from about 1 hour to about 20 hours, such as from about 2 hours to about 12 hours, from about 4 hours to about 10 hours, or from about 6 hours to 8 hours, including all ranges and subranges therebetween. In certain embodiments, the batch composition may be melted in a crucible, such as a platinum crucible, placed in a furnace, such as an electric furnace, although any other suitable melting process known in the art may be used.

According to various embodiments, after melting, the glass melt may be optionally drigaged, for instance, using a water bath. Drigaging breaks up the melt into small fragments, which can optionally be milled to a desired particle size. Alternatively, the drigage particles can be re-melted and poured to form a flattened glass cylinder or any other suitable shape. Optionally the glass melt can be annealed, for example, at a temperature ranging from about 500° C. to about 700° C., such as about 600° C. or about 650° C., including all ranges and subranges therebetween. Alternatively or additionally, the glass melt can be cooled to room temperature prior to further processing.

The precursor glass may subsequently be heat treated according to a ceramming schedule suitable to form a glass-ceramic. Ceramming schedules are known in the art and may vary depending on the properties of the precursor glass and/or the desired properties of the glass-ceramic. It is within the ability of one skilled in the art to control the necessary processing parameters (e.g., ramp rate, temperature, time) as necessary for a particular application. According to various embodiments, the precursor glass may be heated to a temperature ranging from about 700° C. to about 1200° C. and for a time ranging from about 4 hours to about 20 hours.

In some embodiments, the precursor glass may be heated in a two-step or multi-step process. A two-step process typically involves a nucleation step, wherein crystals in the glass begin to form, and a growth step, wherein the crystals grow and form phases in the glass. By way of non-limiting example, the nucleation step may comprise heating a furnace to a first temperature ranging from about 700° C. to about 850° C., such as from about 760° C. to about 820° C., at a ramp rate ranging from about 1 to about 10° C./min, such as about 5° C./min, and holding the furnace at the first temperature for a time ranging from about 0.5 to about 4 hours, such as from about 2 to about 4 hours, including all ranges and subranges therebetween. The growth step may, in certain embodiments, comprise heating the furnace to a second temperature ranging from about 900° C. to about 1200° C., such as from about 950° C. to about 1050° C., at a ramp rate ranging from about 1 to about 10° C./min, such as about 5° C./min, and holding the furnace at the second temperature for a time ranging from about 4 to about 16 hours, such as from about 8 to about 12 hours, including all ranges and subranges therebetween. Other ceramming schedules are known in the art and may be used in accordance with the disclosure to convert the precursor glass into a glass-ceramic.

After heat treatment, the glass-ceramic may be further treated by any conventional method known in the art, for instance, cooling to room temperature, quenching, polishing, milling, etc. The glass-ceramic may optionally be chemically strengthened by glazing or ion exchange. In the case of strengthening via ion exchange, an exemplary glass-ceramic may be immersed in a molten salt bath for a predetermined period of time. Exemplary salt baths include, but are not limited to, $KNO_3$, $LiNO_3$, $NaNO_3$, $RbNO_3$, and combinations thereof. The temperature of the molten salt bath and treatment time period can vary. It is within the ability of one skilled in the art to determine the time and temperature according to the desired application. By way of a non-limiting example, the temperature of the molten salt bath may range from about 400° C. to about 800° C. and the predetermined time period may range from about 4 to about 8 hours, although other temperature and time combinations are envisioned. By way of a non-limiting example, the glass-ceramics can be submerged in a $KNO_3$ bath, for example, at about 450° C. for about 6 hours to obtain a K-enriched layer which imparts a surface compressive stress. Nepheline glass-ceramics have also been potassium ion exchanged at higher temperatures (e.g., about 600-750° C.) to create a kalsilite (KAlSiO$_4$) crystal layer on the surface which creates a high surface compressive stress.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "an oxide" includes examples having two or more such "oxides" unless the context clearly indicates otherwise.

Ranges can be expressed herein as from "about" one particular value, and/or to "about" another particular value. When such a range is expressed, examples include from the one particular value and/or to the other particular value. For example, "about 1-5%" is intended to denote from about 1% to about 5%, from about 1% to 5%, from 1% to about 5%, or from 1% to 5%. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a precursor glass that comprises A+B+C include embodiments where a precursor glass consists of A+B+C and embodiments where a precursor glass consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

The following Examples are intended to be non-restrictive and illustrative only, with the scope of the invention being defined by the claims.

EXAMPLES

Preparation of Glass-Ceramics

Glass-ceramics were prepared by batching and mixing raw materials (silica, alumina, sodium carbonate, potassium carbonate, zinc oxide, titanium dioxide, tin (IV) oxide, and various transition metal oxides (Mn, Fe, Co, Ni, Cu). Each batch composition was melted in a Pt crucible in an electric furnace at 1650° C. for 20 hours and poured out onto a steel plate. The resulting glass was annealed at 650° C. The compositions (expressed as mol %) and observed colors of the resulting precursor glasses are presented in Table I.

TABLE I

Precursor Glass Composition and Color

| Oxide | 1 | 2 | 3 | 4 | 5 | 6 | 7 | Comp. 1 |
|---|---|---|---|---|---|---|---|---|
| $SiO_2$ | 52.48 | 52.22 | 51.96 | 52.48 | 52.92 | 52.95 | 52.48 | 52.68 |
| $Al_2O_3$ | 21.44 | 21.33 | 21.23 | 21.44 | 21.62 | 21.63 | 21.44 | 20.70 |
| $Na_2O$ | 12.18 | 12.12 | 12.06 | 12.18 | 12.28 | 12.29 | 12.18 | 15.52 |
| $K_2O$ | 4.06 | 4.04 | 4.02 | 4.06 | 4.09 | 4.10 | 4.06 | 5.17 |
| ZnO | 2.62 | 2.61 | 3.58 | 2.62 | 2.65 | 2.65 | 2.62 | 0.00 |
| $TiO_2$ | 5.94 | 5.91 | 5.88 | 5.94 | 5.99 | 5.99 | 5.94 | 4.70 |
| $SnO_2$ | 0.30 | 0.30 | 0.29 | 0.30 | 0.30 | 0.30 | 0.30 | 0.28 |
| $MnO_2$ | 0.00 | 0.00 | 0.00 | 0.99 | 0.00 | 0.00 | 0.00 | 0.00 |
| $Fe_2O_3$ | 0.00 | 0.00 | 0.00 | 0.00 | 0.15 | 0.00 | 0.00 | 0.00 |
| $Co_3O_4$ | 0.00 | 0.00 | 0.00 | 0.00 | 0.00 | 0.10 | 0.00 | 0.00 |
| NiO | 0.99 | 1.48 | 0.98 | 0.00 | 0.00 | 0.00 | 0.00 | 0.94 |
| CuO | 0.00 | 0.00 | 0.00 | 0.00 | 0.00 | 0.00 | 0.99 | 0.00 |
| TOTAL | 100.00 | 100.00 | 100.00 | 100.00 | 100.00 | 100.00 | 100.00 | 100.00 |
| $R_2O:Al_2O_3$ | 0.76 | 0.76 | 0.76 | 0.76 | 0.76 | 0.76 | 0.76 | 1.00 |
| COLOR | dark green transparent | green-yellow transparent | green-yellow transparent | amber transparent | dark brown transparent | dark blue transparent | amber transparent | brown transparent |

The precursor glasses were converted to glass-ceramics by heat treatment in an electric box furnace in air at temperatures ranging from 750° C. to 1100° C. for times ranging from 4 to 20 hours, depending on the ceramming schedule employed. A two-step schedule was employed in which the furnace was first heated at a ramp rate of about 5° C./min to a first temperature ranging from 760° C. to 820° C. and held at the first temperature for a time ranging from 0.5 to 4 hours (nucleation step) and then heated at a ramp rate of about 5° C./min to a second temperature ranging from 950° C. to 1050° C. and held at the second temperature for a time ranging from 4 hours to 16 hours (growth step). The furnace was then cooled to room temperature. The specific ceramming schedules and the phase assemblage (as determined by X-ray diffraction (XRD)) and color (0.8 mm thick, polished) of the resulting glass-ceramics are presented in Table II.

TABLE II

Ceramming Schedules and Resulting Glass-Ceramics

| | 1 | 2 | 3 | 4 |
|---|---|---|---|---|
| Ceram 1 820 C.-2 h + 950 C.-4 h | | | | |
| Phase Assemblage (XRD) | | | | nepheline, gahnite, $KAlSi_2O_5$, glass |
| Color (0.8 mm, polished) | blue-green opaque | | | brown opaque |
| Ceram 2 820 C.-2 h + 1000 C.-4 h | | | | |
| Phase Assemblage (XRD) | | nepheline, gahnite, glass | nepheline, gahnite, $Na_{17}Al_5O_{16}$, glass | nepheline, gahnite, $K_3Ti_4O_9$, $KAlSi_2O_6$, glass |
| Color (0.8 mm, polished) | green-blue opaque | green-blue opaque | blue-green opaque | khaki tan opaque |
| Ceram 3 760 C.-2 h + 1025 C.-4 h | | | | |
| Phase Assemblage (XRD) | nepheline, rutile, gahnite, glass | | | |
| Color (0.8 mm, polished) | light green-blue opaque | | | |

TABLE II-continued

Ceramming Schedules and Resulting Glass-Ceramics

|  | 1 | 2 | 3 | 4 |
|---|---|---|---|---|
| Ceram 4 760 C.-2 h + 1025 C.-16 h | | | | |
| Phase Assemblage (XRD) | nepheline, rutile, gahnite, glass | | | |
| Color (0.8 mm, polished) | light sky blue opaque | | | |
| Ceram 5 820 C.-2 h + 1025 C.-4 h | | | | |
| Phase Assemblage (XRD) | | nepheline, gahnite, rutile, glass | nepheline, gahnite, rutile, glass | nepheline, gahnite, $K_2Ti_4O_9$, $KAlSi_2O_6$, glass |
| Color (0.8 mm, polished) | light green-blue opaque | light green-blue opaque | light blue-green opaque | tan opaque |
| Ceram 6 820 C.-2 h + 1025 C.-16 h | | | | |
| Phase Assemblage (XRD) | | nepheline, gahnite, glass | nepheline, gahnite, glass | nepheline, gahnite, $K_2Ti_4O_9$, $KAlSi_2O_6$, glass |
| Color (0.8 mm, polished) | | sky blue opaque | light blue-green opaque | yellow opaque |
| Ceram 7 760 C.-2 h + 1050 C.-4 h | | | | |
| Phase Assemblage (XRD) | nepheline, rutile, gahnite, glass | | | |
| Color (0.8 mm, polished) | light sky blue opaque | | | |
| Ceram 8 780 C.-2 h + 1050 C.-4 h | | | | |
| Phase Assemblage (XRD) | | | | |
| Color (0.8 mm, polished) | | | | |
| Ceram 9 780 C.-2 h + 1050 C.-4 h | | | | |
| Phase Assemblage (XRD) | | nepheline, gahnite, glass | nepheline, gahnite, glass | nepheline, gahnite, glass |
| Color (0.8 mm, polished) | light sky blue opaque | sky blue opaque | light blue-green opaque | yellow opaque |
| Other Cerams 740 C.-2 h + 1025 C.-4 h 760 C.-.5 h + 1025 C.-4 h 760 C.-4 h + 1025 C.-4 h 760 C.-2 h + 1025 C.-8 h 780 C.-2 h + 1025 C.-4 h | | | | |
| Color (0.8 mm, polished) | light green-blue opaque | | | |

|  | 5 | 6 | 7 | Comp. 1 |
|---|---|---|---|---|
| Ceram 1 820 C.-2 h + 950 C.-4 h | | | | |
| Phase Assemblage (XRD) | nepheline, gahnite, $KAlSi_2O_6$, glass | nepheline, gahnite, $Na_{17}Al_5O_{16}$, glass | nepheline, gahnite, glass | nepheline, $TiNiO_3$ |
| Color (0.8 mm, polished) | navy blue opaque | teal blue opaque | dark gray opaque | dark sage green opaque |
| Ceram 2 820 C.-2 h + 1000 C.-4 h | | | | |
| Phase Assemblage (XRD) | nepheline, gahnite, glass | nepheline, gahnite, $Na_{17}Al_5O_{16}$, glass | nepheline, gahnite, glass | nepheline, $TiNiO_3$ |
| Color (0.8 mm, polished) | gray-blue opaque | dark ocean blue opaque | purple-gray opaque | sage green opaque |
| Ceram 3 760 C.-2 h + 1025 C.-4 h | | | | |
| Phase Assemblage (XRD) | | | | |
| Color (0.8 mm, polished) | | | | sage green opaque |

TABLE II-continued

Ceramming Schedules and Resulting Glass-Ceramics

Ceram 4
760 C.-2 h + 1025 C.-16 h

| | | | | |
|---|---|---|---|---|
| Phase Assemblage (XRD) | | | | |
| Color (0.8 mm, polished) | | | | light sage green opaque |

Ceram 5
820 C.-2 h + 1025 C.-4 h

| | | | | |
|---|---|---|---|---|
| Phase Assemblage (XRD) | nepheline, gahnite, glass | nepheline, gahnite, $Na_{17}Al_5O_{16}$, glass | nepheline, gahnite, glass | |
| Color (0.8 mm, polished) | light gray-blue opaque | ocean blue opaque | light purple-gray opaque | |

Ceram 6
820 C.-2 h + 1025 C.-16 h

| | | | | |
|---|---|---|---|---|
| Phase Assemblage (XRD) | nepheline, gahnite, glass | nepheline, gahnite, glass | nepheline, gahnite, glass | |
| Color (0.8 mm, polished) | very light gray-purple opaque | bright blue opaque | Very light purple-gray opaque | |

Ceram 7
760 C.-2 h + 1050 C.-4 h

| | | | | |
|---|---|---|---|---|
| Phase Assemblage (XRD) | | | | |
| Color (0.8 mm, polished) | | | | light sage green opaque |

Ceram 8
780 C.-2 h + 1050 C.-4 h

| | | | | |
|---|---|---|---|---|
| Phase Assemblage (XRD) | | | | nepheline, $TiNiO_3$ |
| Color (0.8 mm, polished) | | | | light sage green opaque |

Ceram 9
780 C.-2 h + 1050 C.-4 h

| | | | | |
|---|---|---|---|---|
| Phase Assemblage (XRD) | nepheline, gahnite, glass | nepheline, gahnite, glass | nepheline, gahnite, glass | nepheline, $TiNiO_3$ |
| Color (0.8 mm, polished) | light gray-purple opaque | bright blue opaque | very light purple-gray opaque | light sage green opaque |

Other Cerams
740 C.-2 h + 1025 C.-4 h
760 C.-.5 h + 1025 C.-4 h
760 C.-4 h + 1025 C.-4 h
760 C.-2 h + 1025 C.-8 h
780 C.-2 h + 1025 C.-4 h

| | | | | |
|---|---|---|---|---|
| Color (0.8 mm, polished) | | | | sage green opaque |

As can be appreciated from Table II, inventive precursor glasses 1-7 (comprising ZnO) yielded glass-ceramics comprising both nepheline and gahnite crystal phases exhibiting bright colors, including yellows, greens, blues, and purples. In contrast, comparative precursor glass 1 (not comprising ZnO) yielded glass-ceramics without a gahnite crystal phase and exhibiting earth tone (sage) colors. Specifically comparing inventive Example 1 and comparative Example 1, which were both doped with $Ni^{+2}$, it was observed that inventive glass-ceramics had colors ranging from blue-green (at the lower ceram temperatures) to light sky blue (at the higher ceram temperatures), whereas the comparative glass-ceramics exhibited only sage (gray-green) colors instead of blues.

Figure 2:
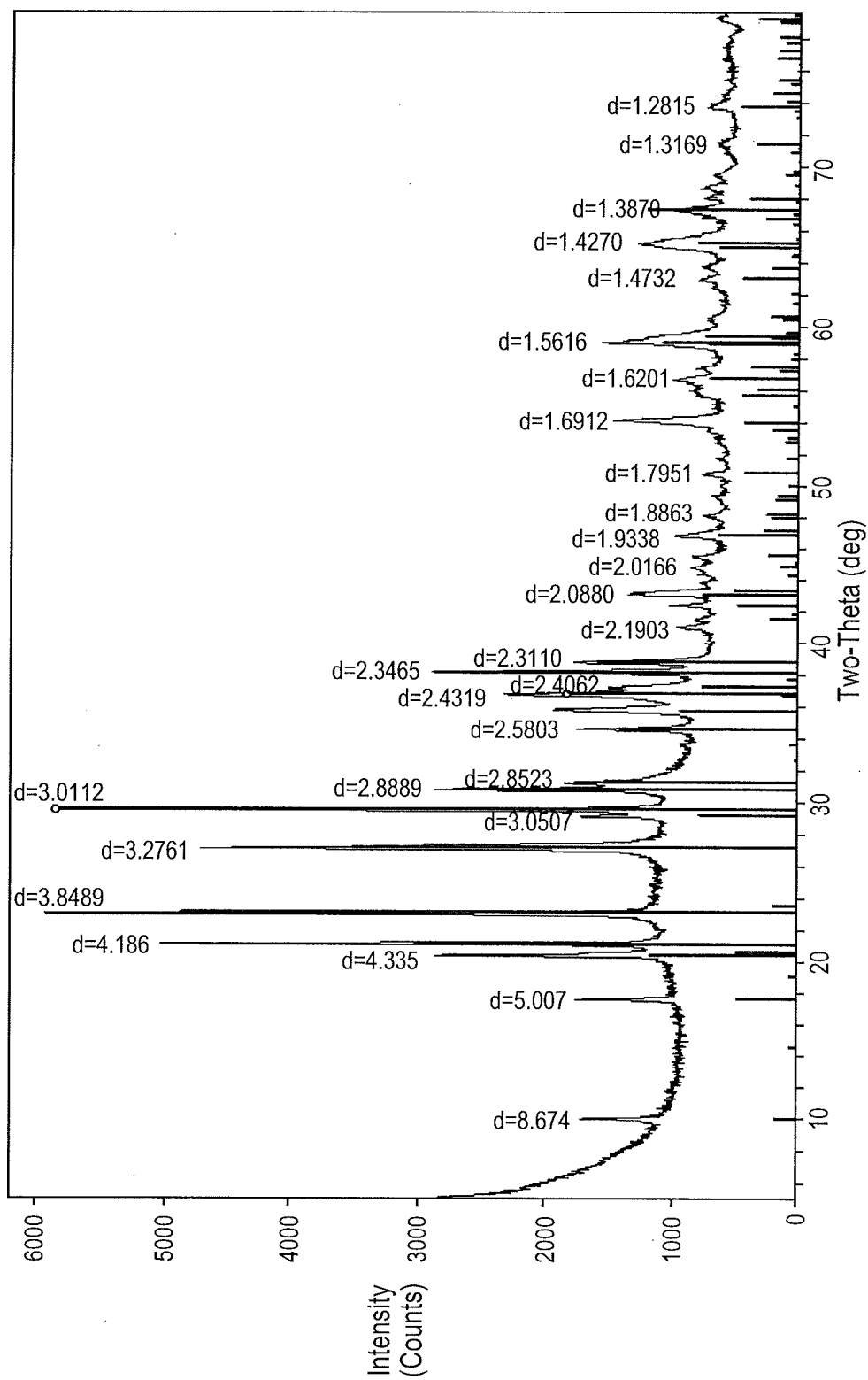
FIG. 2 is an XRD pattern of an opaque glass-ceramic produced according to one embodiment of the disclosure.
Figure 3:
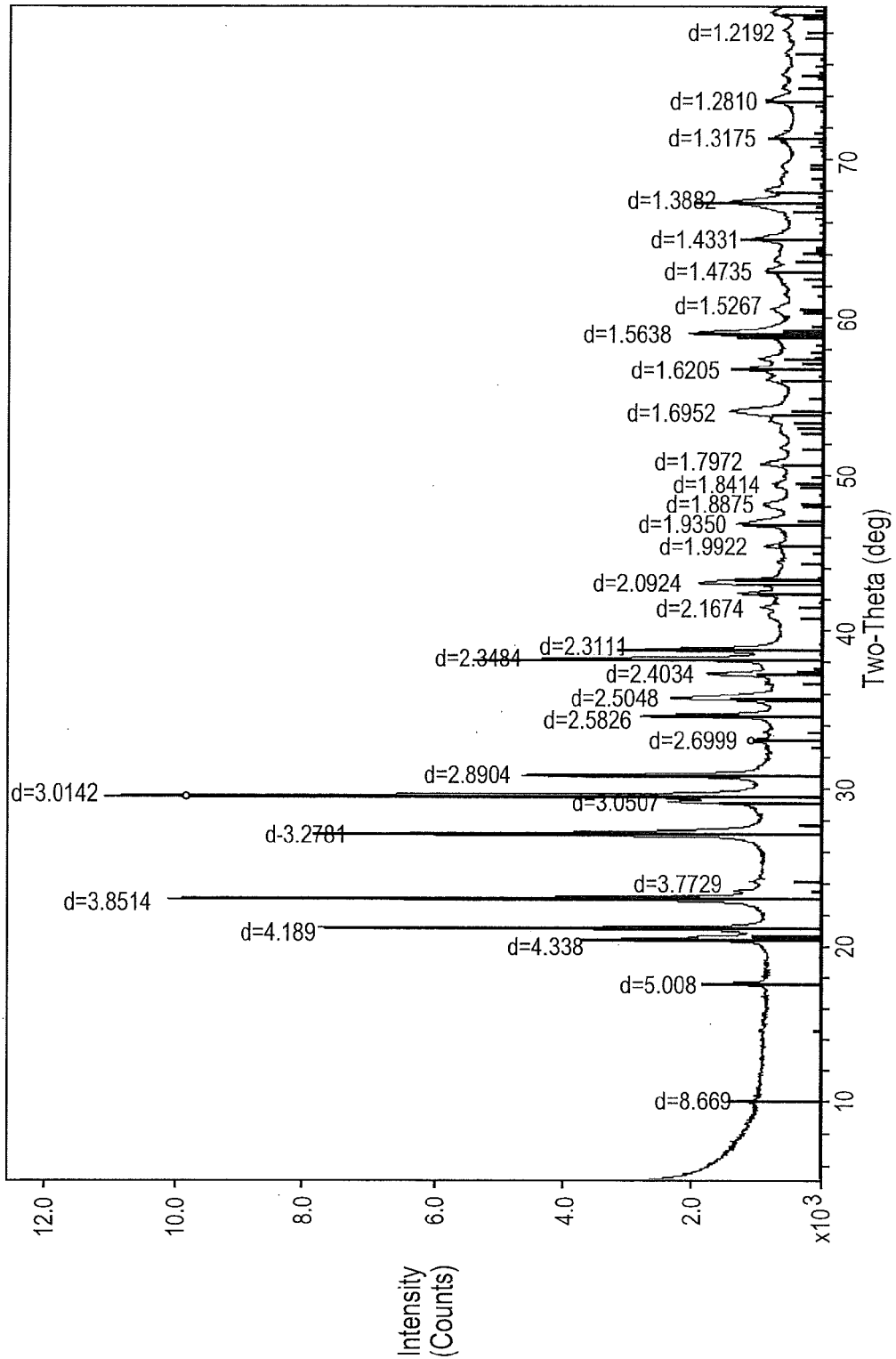
FIG. 3 is an XRD pattern of a comparative glass-ceramic produced according to prior art methods.

X-ray diffraction (XRD) spectra were obtained for various glass-ceramics using powdered samples. FIG. 1 is the XRD spectrum of inventive Example 1 (760° C. for 2 hours+1050° C. for 4 hours). FIG. 2 is the XRD spectrum of inventive Example 2 (820° C. for 2 hours+1025° C. for 16 hours). These glass-ceramics comprised nepheline ((Na, K)$AlSiO_4$), gahnite ($ZnAl_2O_4$), and rutile ($TiO_2$) crystal phases dispersed in a residual glass phase. FIG. 3 is the XRD spectrum of comparative Example 1 (780° C. for 2 hours+1050° C. for 4 hours). This glass-ceramic comprises nepheline and $TiNiO_3$ crystalline phases. No gahnite is present in the comparative glass-ceramic.

The presence of a residual glass phase containing alkali ions indicates that the inventive glass-ceramics can be chemically strengthened by an ion exchange process, such as a potassium ion exchange.

Reflectance/Transmission/Absorption

Total and diffuse reflectance measurements were performed on samples core-drilled from the glass-ceramics and polished to a thickness of approximately 0.8 mm. The measurements were taken using a UV-Vis-NIR spectrophotometer with an integrating sphere. Reflectance measurements were performed with the sample mounted directly to the face of the sphere's exit port hole. Total reflectance data were collected with the sample mounted at 8° incidence to the light beam. Diffuse reflectance data were collected with the sample normal to the light beam with the sphere's entrance port open. Diffuse reflectance data were converted to L*a*b* color coordinates for D65, F02, and A illuminants and 10-deg standard observer.

Figure 4A:
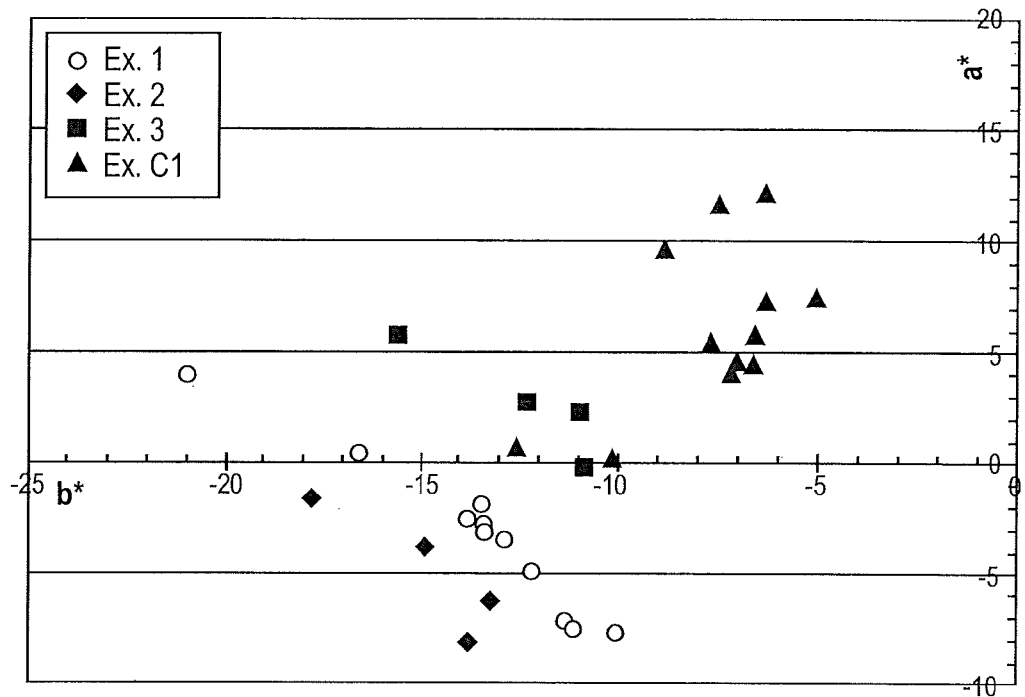
FIG. 4A illustrates a* and b* coordinates for opaque glass-ceramics produced according to various embodiments of the disclosure and a comparative glass-ceramic produced by prior art methods.
Figure 4B:
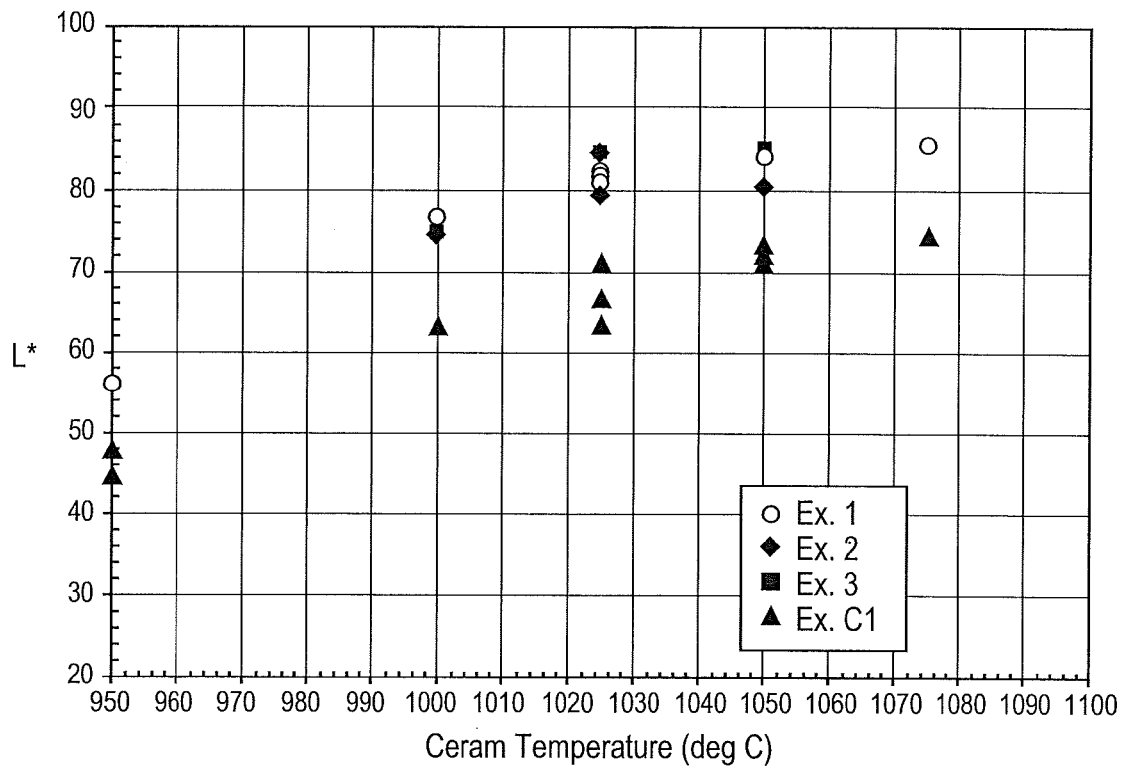
FIG. 4B illustrates L* coordinates for opaque glass-ceramics produced according to various embodiments of the disclosure and a comparative glass-ceramic produced by prior art methods.

FIGS. 4A-B illustrate the a* and b* and L* coordinates, respectively, for glass-ceramics produced according to inventive Example 1 (represented by circles), inventive Example 2 (represented by diamonds), inventive Example 3 (represented by squares), and comparative Example 1 (represented by triangles). The figures show that the nepheline-gahnite (inventive) and nepheline (comparative) glass-ceramics occupy different color spaces.

Figure 5:
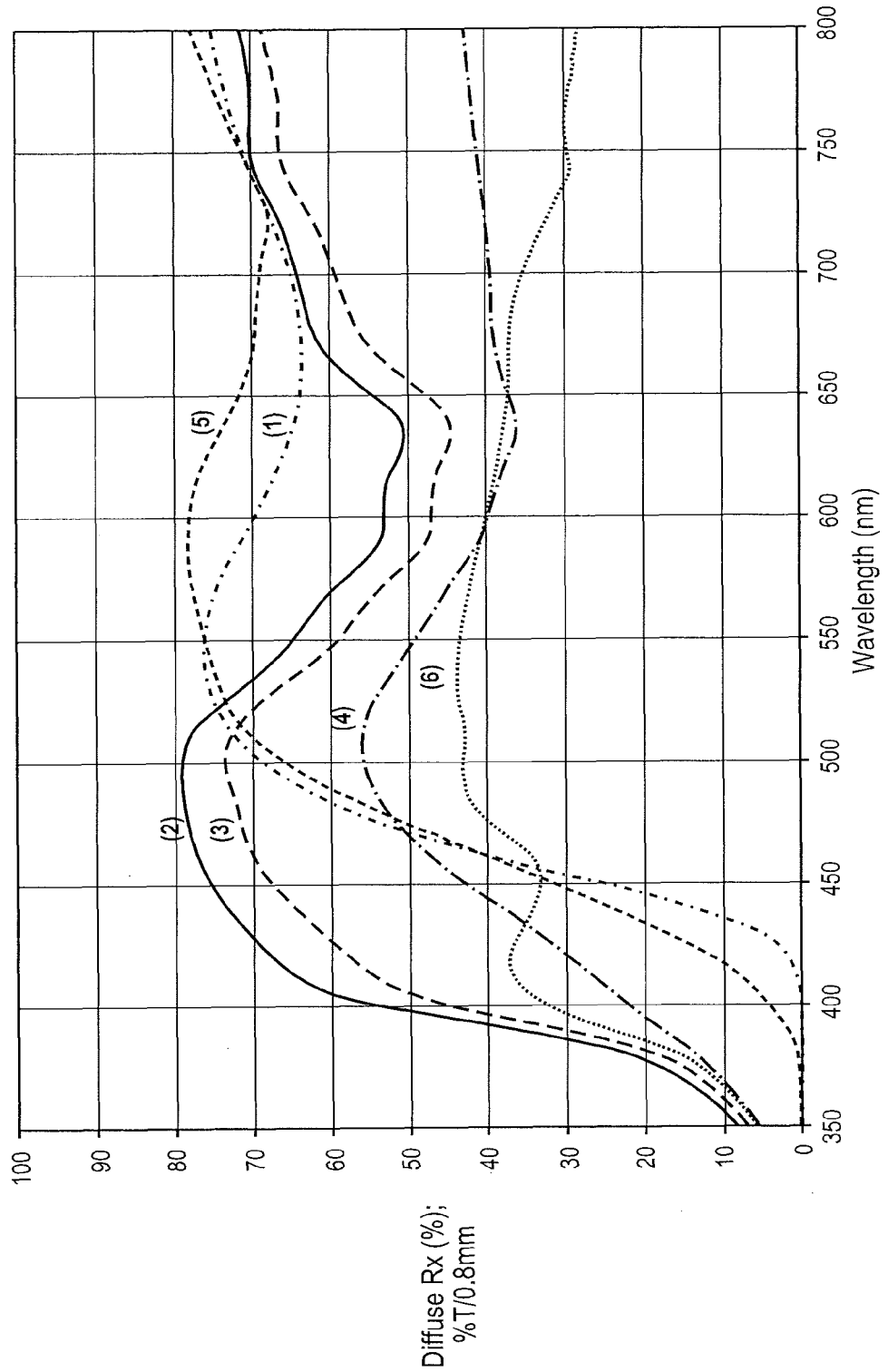
FIG. 5 illustrates diffuse reflection spectra for opaque glass-ceramics produced according to various embodiments of the disclosure and a comparative glass-ceramic produced by prior art methods, as well as the transmission spectra of their precursor glasses.

FIG. 5 illustrates the transmission spectra of the precursor glasses (0.8 mm thick) for both inventive Example 1 and comparative Example 1. Plot (1) corresponds to the as-made inventive Example 1 glass, whereas (5) corresponds to the as-made comparative Example 1 glass. Also illustrated are the diffuse reflection spectra for inventive Examples 1-3 and comparative Example 1 glass-ceramics. Plot (2) corresponds to the glass-ceramic of inventive Example 1 (760° C. for 2 hours+1050° C. for 4 hours), (3) is inventive Example 2 (820° C. for 2 hours+1025° C. for 16 hours), (4) is inventive Example 3 (820° C. for 2 hours+1000° C. for 4 hours), and (6) is comparative Example 1 (780° C. for 2 hours+1050° C. for 4 hours). The spectra undergo a notable change from the precursor glass to the glass-ceramic due to crystallization and partitioning of the $Ni^{+2}$ colorant ions into different phases. Moreover, the spectra of the inventive glass-ceramics are significantly different from the comparative glass-ceramic. The inventive glass-ceramics show a high reflectance at blue (~475 nm) and green (~510 nm) wavelengths, with reduced reflectance at longer wavelengths. The comparative glass-ceramic shows a more uniform reflectance elevated at green and yellow (~570 nm) wavelengths.

Figure 6:
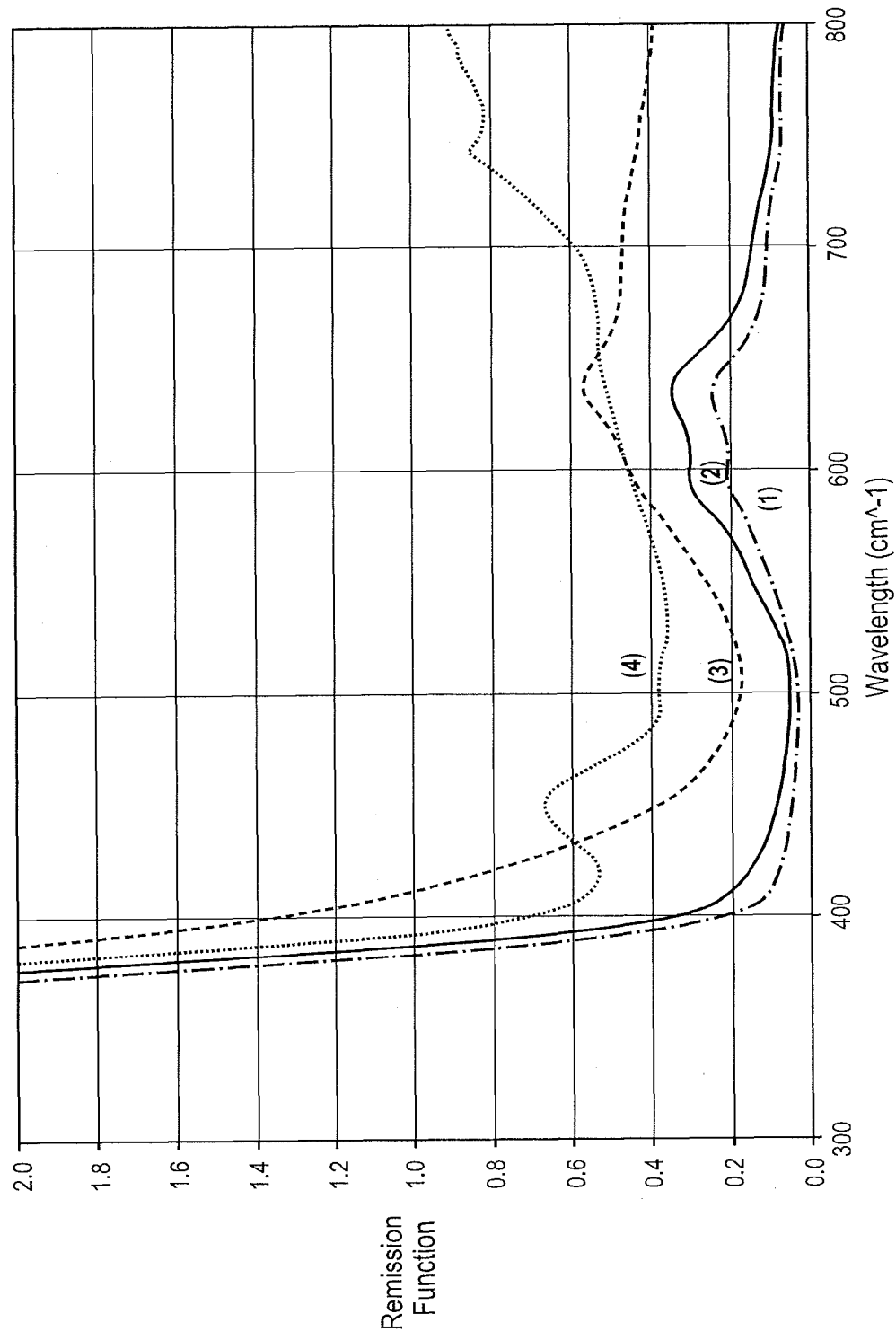
FIG. 6 illustrates remission spectra for opaque glass-ceramics produced according to various embodiments of the disclosure and a comparative glass-ceramic produced by prior art methods.

The diffuse reflectance data for inventive Examples 1-3 and comparative Example 1 glass-ceramics were converted using the remission function: $f(R)=(1-R)^2/2R \sim K/S$, where R is the diffuse reflectance, K is the absorption coefficient, and S is the scattering coefficient. The remission spectra were then replotted and illustrated in FIG. 6, where (1) is inventive Example 1 (760° C. for 2 hours+1050° C. for 4 hours), (2) is inventive Example 2 (820° C. for 2 hours+1025° C. for 16 hours), (3) is inventive Example 3 (820° C. for 2 hours+1000° C. for 4 hours), and (4) is comparative Example 1 (780° C. for 2 hours+1050° C. for 4 hours). These spectra are proportional to the absorption spectra of the materials. The remission spectra of the inventive glass-ceramics were observed to be similar to the absorption spectrum of a transparent, blue, Ni-doped spinel glass-ceramic reported in the literature (S. Khonthon, et. al, *J. Ceram. Soc.* Japan, 114 [9]: 791-794 (2006)), whereas the remission spectrum of the comparative glass-ceramic was dissimilar. The inventive glass-ceramics exhibit absorption bands at ~385 nm, ~595 nm, and ~635 nm, which have been correlated to $Ni^{+2}$ cations in the tetrahedral sites of gahnite and spinel crystals. Furthermore, the decrease in absorption around 430 nm with increasing ceram temperatures is believed to be indicative of $Ni^{+2}$ cations in the glass partitioning into the crystalline phase.

Crystallography/Composition

Figure 7A:
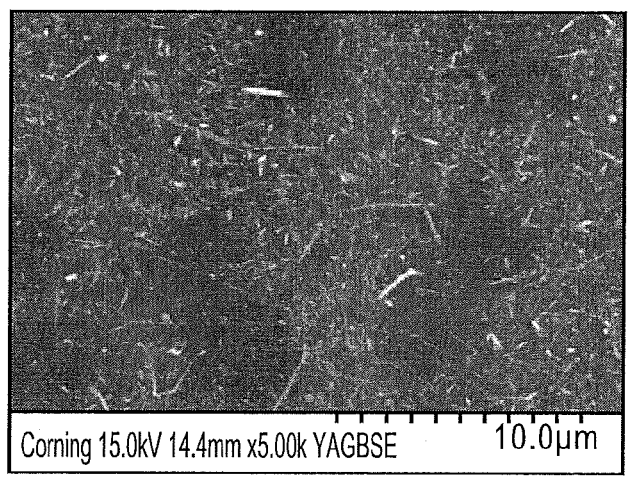
FIG. 7A is a backscattered SEM image of an opaque glass-ceramic produced according to one embodiment of the disclosure.
Figure 7B:
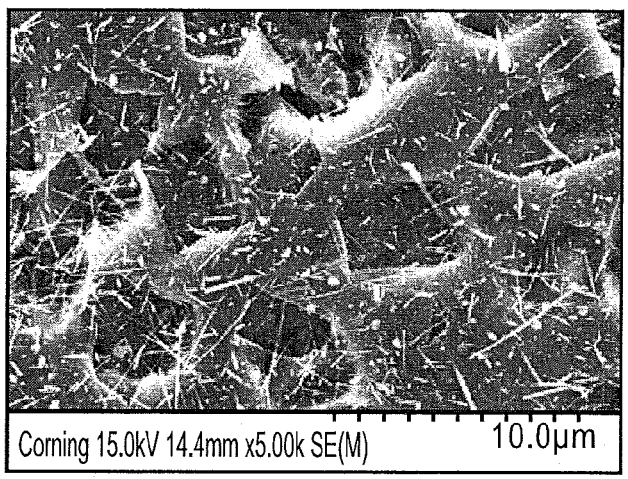
FIG. 7B is a backscattered SEM image of an opaque glass-ceramic produced according to one embodiment of the disclosure.
Figure 7C:
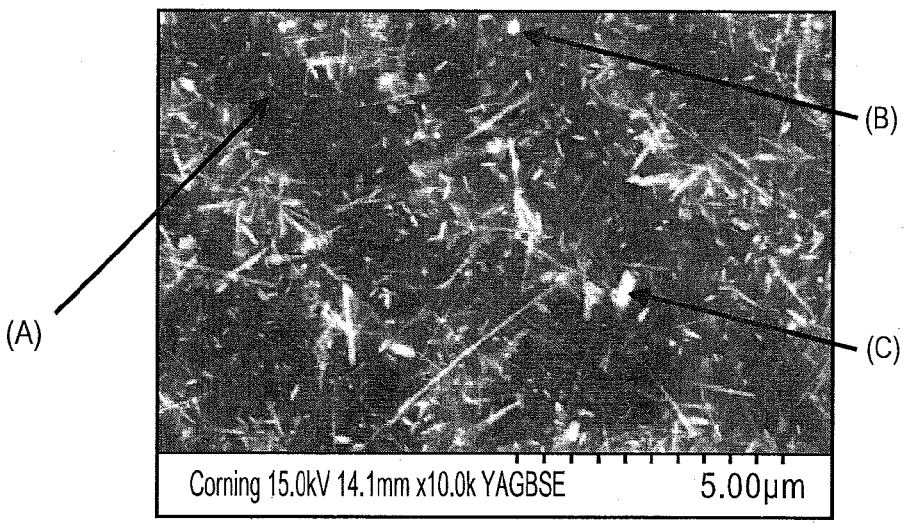
FIG. 7C is a backscattered SEM image of an opaque glass-ceramic produced according to one embodiment of the disclosure.

Scanning electron microscopy (SEM) was used to obtain images of the different phases of the inventive and comparative glass-ceramics. FIG. 7A is a backscattered SEM image of a polished glass-ceramic prepared according to inventive Example 1 (760° C. for 2 hours+1050° C. for 4 hours) glass-ceramic. FIG. 7B is a backscattered SEM image of a glass-ceramic prepared according to inventive Example 1 (760° C. for 2 hours+1050° C. for 4 hours), which was acid-etched to show the size of the nepheline crystals. FIG. 7C is a back-scattered SEM image of a polished glass-ceramic prepared according to inventive Example 2 (780° C. for 2 hours+1025° C. for 16 hours). Four phases are identifiable (see FIG. 7C): (A) dark gray, blocky crystals 2-5 microns in size, (B) bright round/hexagonal crystals, (C) bright rectangular/needle-shaped crystals, and (D) a light gray phase.

Figure 8A:
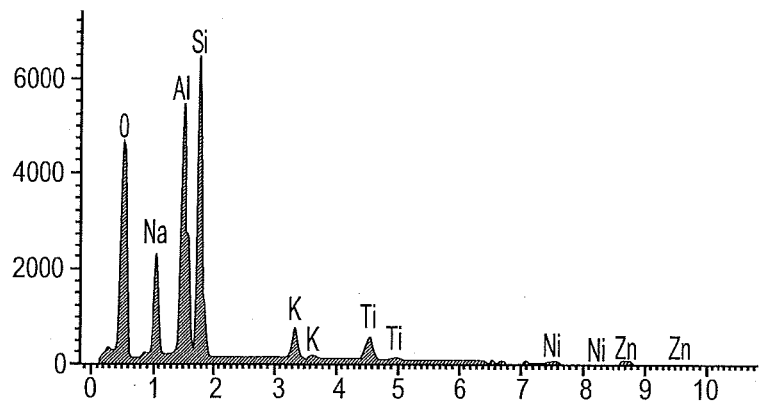
FIG. 8A is an EDS spectrum of a dark gray, blocky phase pictured in the SEM image of FIG. 7C.
Figure 8B:
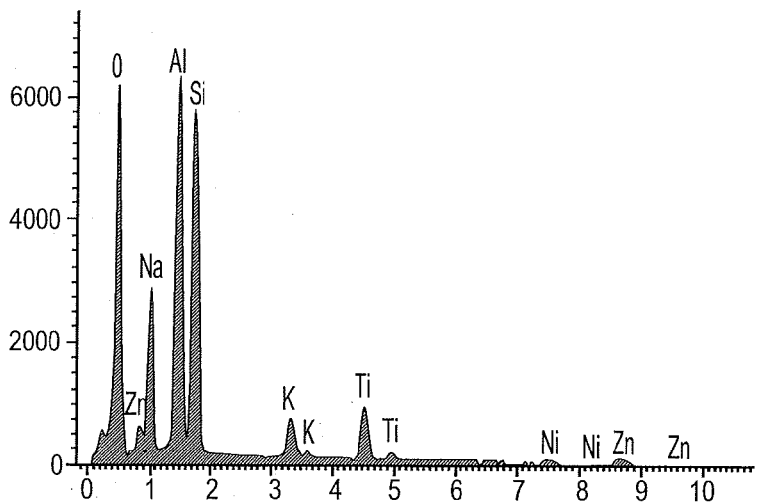
FIG. 8B is an EDS spectrum of a bright round phase pictured in the SEM image of FIG. 7C.
Figure 8C:
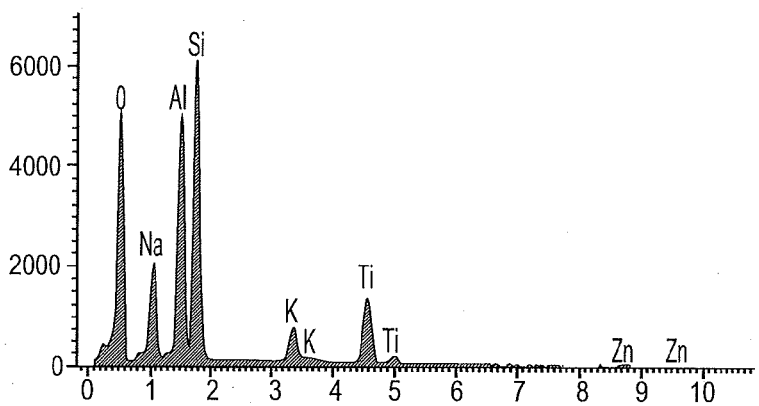
FIG. 8C is an EDS spectrum of a bright rectangular phase pictured in the SEM image of FIG. 7C.

FIG. 8A is the EDS spectrum (analysis area ~2 microns) of the dark gray, blocky phase (A), FIG. 8B is the EDS spectrum of the bright round phase (B), and FIG. 8C is the EDS spectrum of the bright rectangular phase (C). The EDS spectra confirm that phase (A) is nepheline, phase (B) gahnite, phase (C) is a titanate phase, and phase (D) is residual glass. It was noted that Ni, Zn, and Al were more concentrated in the gahnite phase (B).

Transmission electron microscopy (TEM) was also used to obtain images of the microstructure of the glass-ceramic prepared according to inventive Example 2 (780° C. for 2 hours+1025° C. for 16 hours), as well as EDS composition maps for the component elements (Ni, Zn, Ti, Si). The EDS maps of the Ni, Zn, Al, Ti, and Si concentrations (not illustrated) demonstrated that Ni is concentrated in the Zn- and Al-containing crystals (gahnite), not in the titanate crystals or silicate (nepheline, residual glass) phases.

What is claimed is:

1. An opaque glass-ceramic comprising:
   at least one nepheline crystal phase,
   a spinel-structure phase doped with at least one colorant chosen from transition metals and rare earth metal elements, and wherein the spinel-structure phase selected from the group consisting of gahnite, magnesio-gahnite, magnesium aluminate, and combinations thereof, and
   a composition comprising
   $SiO_2$ in an amount in the range from about 30 mol % to about 65 mol %,
   $Al_2O_3$ in an amount in the range from about 15 mol % to about 40 mol %,
   $Na_2O$ and $K_2O$ present in an amount such that the total amount of $Na_2O$ and $K_2O$ ($Na_2O+K_2O$) is in the range from about 10 mol % to about 20 mol %,
   ZnO in an amount in the range from about 0 mol % to about 10 mol %, and MgO in an amount in the range from about 0 mol % to about 10 mol %, wherein the combined amount of ZnO and MgO (ZnO+MgO) is in the range from about 1 mol % to about 10 mol %.

2. The opaque glass-ceramic of claim 1, wherein the composition comprises $SiO_2$ in an amount in the range from about 45 mol % to about 65 mol %, $Al_2O_3$ in an amount in the range from about 20 mol % to about 30 mol %, $Na_2O$ in an amount in the range from about 5 mol % to about 15 mol %, $K_2O$ in an amount in the range from about 1 mol % to about 10 mol %, ZnO in an amount in the range from about 1 mol % to about 5 mol %, MgO in an amount in the range from about 0 mol % to about 5 mol %, and includes at least one colorant chosen from transition metals and rare earth elements.

3. The opaque glass-ceramic of claim 1, wherein the molar ratio of ($Na_2O+K_2O$) to $Al_2O_3$ is less than about 1.

4. The opaque glass-ceramic of claim 1, further comprising either one or both
   $TiO_2$ in an amount in the range from about 0 mol % to about 12 mol %, and
   $ZrO_2$ in an amount in the range from about 0 mol % to about 12 mol %,
   wherein the total amount of $TiO_2$ and $ZrO_2$ ($TiO_2+ZrO_2$) is in the range from about 4 mol % to about 12 mol %.

5. The opaque glass-ceramic of claim 1, wherein the glass-ceramic comprises about at least one oxide chosen from transition metal oxides and rare earth oxides, wherein the oxide is present in an amount in the range from about 0.05 mol % to about 5 mol %.

6. The opaque glass-ceramic of claim 5, wherein the transition metal oxides are chosen from oxides of manganese, iron, cobalt, nickel, copper, vanadium, chromium, and combinations thereof.

7. The opaque glass-ceramic of claim 1, wherein the glass-ceramic is lithium-free.

8. The opaque glass-ceramic of claim 1, wherein the glass-ceramic is chemically strengthened by ion exchange.

* * * * *